US011707156B2

(12) United States Patent
White

(10) Patent No.: US 11,707,156 B2
(45) Date of Patent: Jul. 25, 2023

(54) OUTDOOR ROTISSERIE SYSTEM FOR ROASTING MEAT

(71) Applicant: Gregory A. White, Taylor, TX (US)

(72) Inventor: Gregory A. White, Taylor, TX (US)

( * ) Notice: Subject to any disclaimer, the term of this patent is extended or adjusted under 35 U.S.C. 154(b) by 1044 days.

(21) Appl. No.: 16/511,670

(22) Filed: Jul. 15, 2019

(65) Prior Publication Data

US 2021/0015299 A1  Jan. 21, 2021

(51) Int. Cl.
*A47J 33/00* (2006.01)
*A47J 37/04* (2006.01)

(52) U.S. Cl.
CPC ............ *A47J 37/043* (2013.01); *A47J 33/00* (2013.01); *A47J 37/047* (2013.01)

(58) Field of Classification Search
CPC ......... A47J 33/00; A47J 37/043; A47J 37/047
USPC ....................................................... 99/443 R
See application file for complete search history.

(56) References Cited

U.S. PATENT DOCUMENTS

| | | | | |
|---|---|---|---|---|
| 2,893,307 A * | 7/1959 | Rodriguez | ............ | A47J 37/041 99/392 |
| 3,298,301 A * | 1/1967 | Lowndes | ............ | A47J 37/0745 99/443 R |
| 3,742,839 A * | 7/1973 | Maley | ................. | A47J 37/0745 126/25 R |
| 3,802,331 A * | 4/1974 | Zickefoose | ............ | A47J 37/049 99/427 |
| 4,820,054 A * | 4/1989 | Wong | ....................... | B01F 27/95 99/348 |
| 4,942,807 A * | 7/1990 | Wong | .................... | A47J 43/044 414/781 |
| 5,445,065 A * | 8/1995 | Lopata | .................. | A47J 37/042 99/421 H |
| 5,515,774 A * | 5/1996 | Swisher | ................. | A47J 37/041 99/421 H |
| 5,533,440 A * | 7/1996 | Sher | ....................... | A47J 37/041 99/421 H |
| 5,549,467 A * | 8/1996 | Schultz | .................. | A21C 11/04 425/315 |
| 6,343,544 B1 * | 2/2002 | Bellion | ................. | A47J 37/042 99/421 H |
| 6,439,109 B1 * | 8/2002 | Rehill | .................... | A47J 37/041 D7/338 |
| 6,584,889 B2 * | 7/2003 | Friel, Sr. | ............. | A47J 37/0814 219/400 |
| 7,856,924 B1 * | 12/2010 | Stihi | ................... | A47J 37/0731 126/25 AA |
| 9,993,109 B2 * | 6/2018 | Brown | .................. | A47J 37/041 |

(Continued)

*Primary Examiner* — Eric S Stapleton
(74) *Attorney, Agent, or Firm* — Hunt Pennington Kumar PLLC; Jeff Hunt

(57) ABSTRACT

An outdoor rotisserie system may include a set of legs, a rotisserie drive system supported by the set of legs, a drive-to-basket connecting assembly supported by the rotisserie drive system, and a meat basket assembly supported by the drive-to-basket connecting assembly. The meat basket assembly may be driven for rotation about a vertical axis. The meat basket assembly may include a basket top bar supporting basket sides formed of open mesh wire material. The system may include a heat deflector assembly spaced from the meat basket assembly, which may form a partial enclosure directing heat of an adjacent roasting fire toward the meat basket assembly.

20 Claims, 10 Drawing Sheets

(56) References Cited

U.S. PATENT DOCUMENTS

| | | | | |
|---|---|---|---|---|
| 2002/0189462 A1* | 12/2002 | Guess | ................... | A47J 36/321 |
| | | | | 99/421 H |
| 2005/0160920 A1* | 7/2005 | Guess | ..................... | A47J 37/04 |
| | | | | 99/419 |
| 2007/0283822 A1* | 12/2007 | Sheridan | ............... | A47J 37/048 |
| | | | | 99/441 |
| 2017/0055767 A1* | 3/2017 | Brown | .................. | A47J 37/041 |
| 2017/0055768 A1* | 3/2017 | Brown | .................. | A47J 37/041 |

* cited by examiner

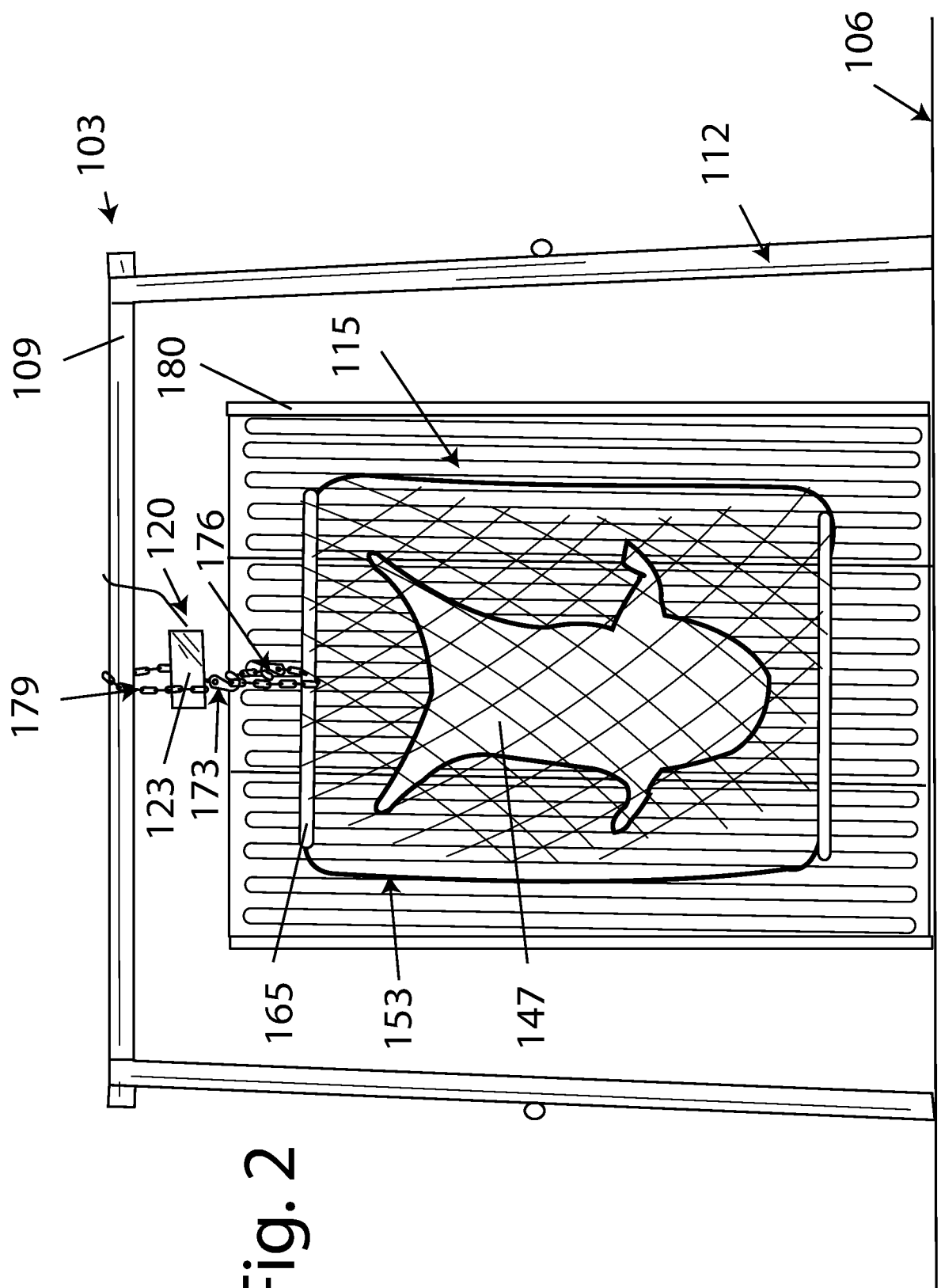

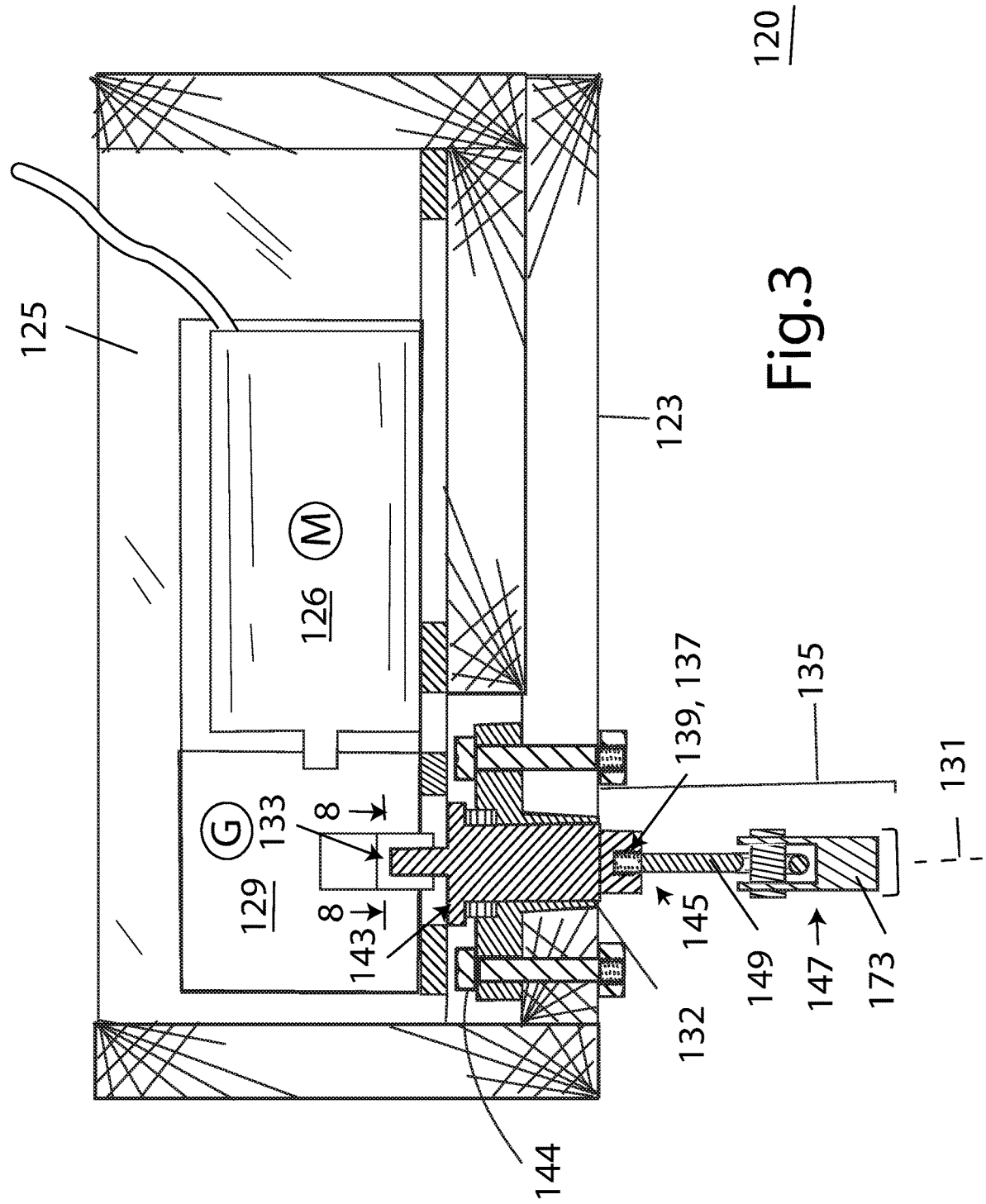

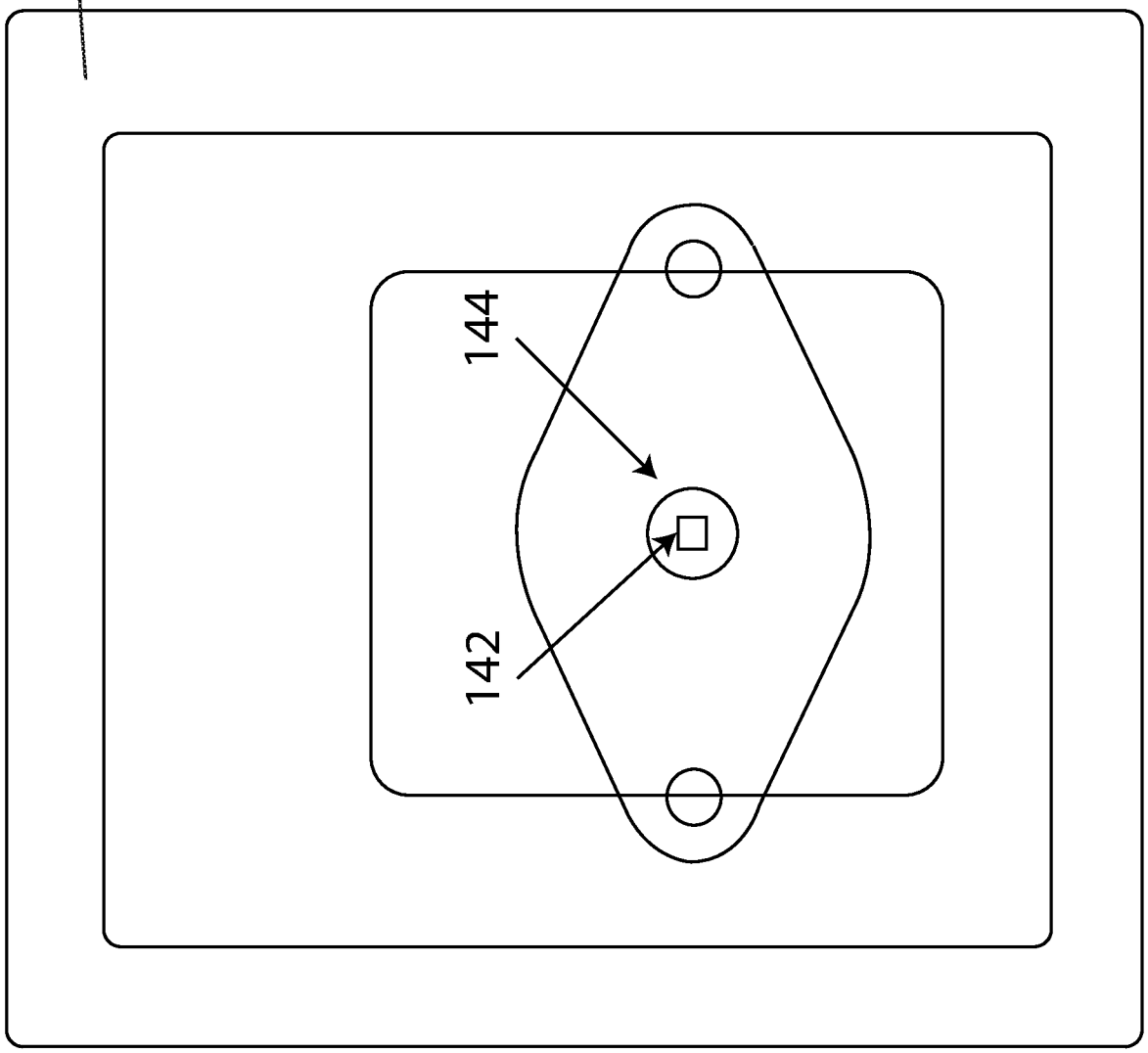

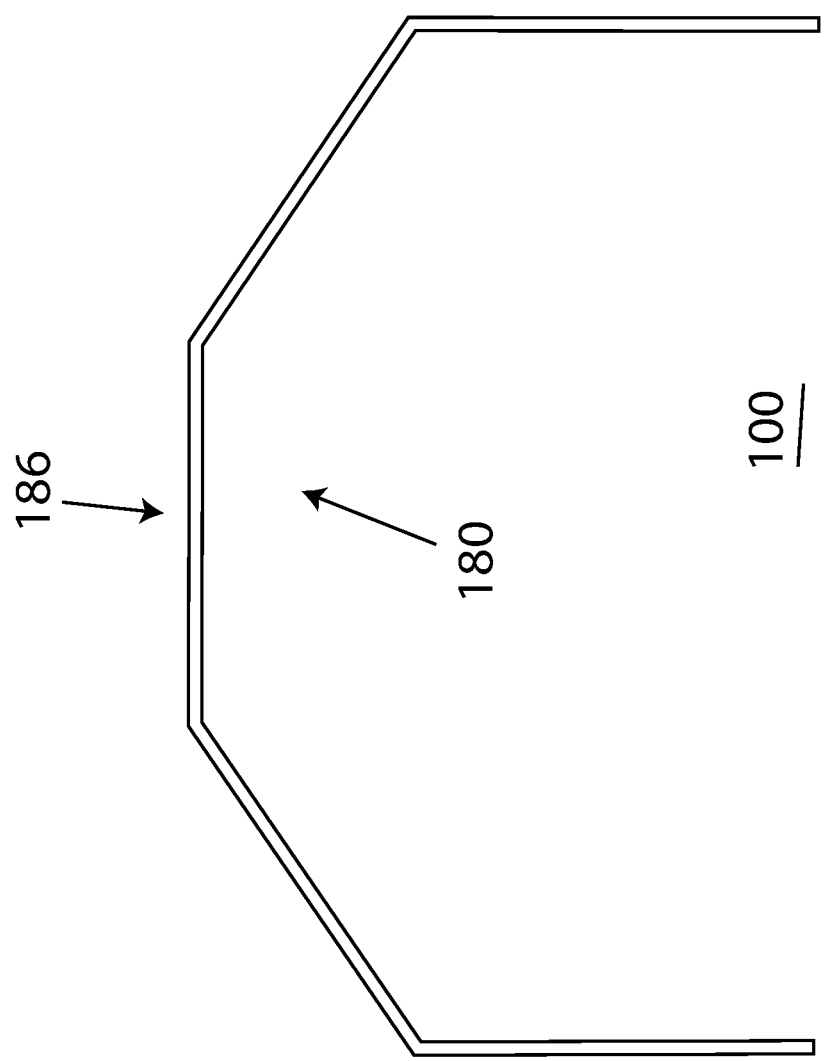

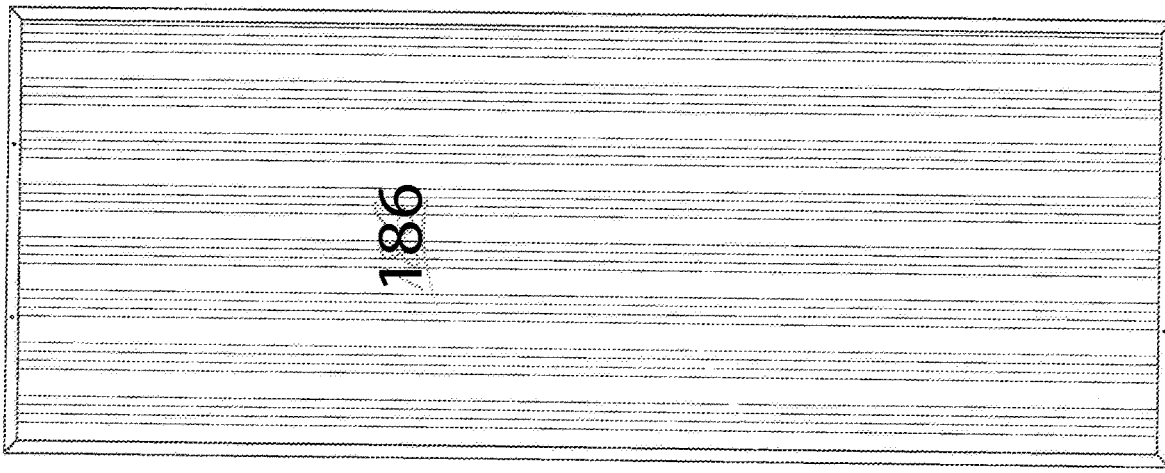

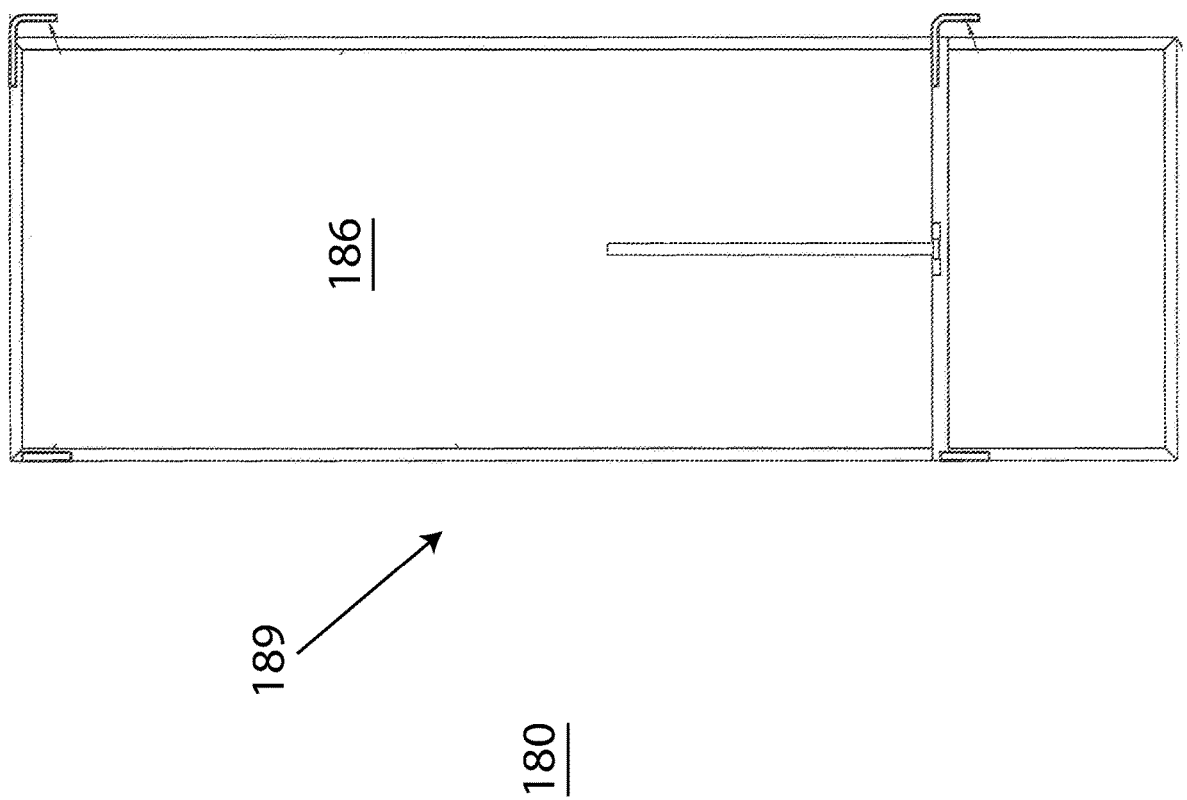

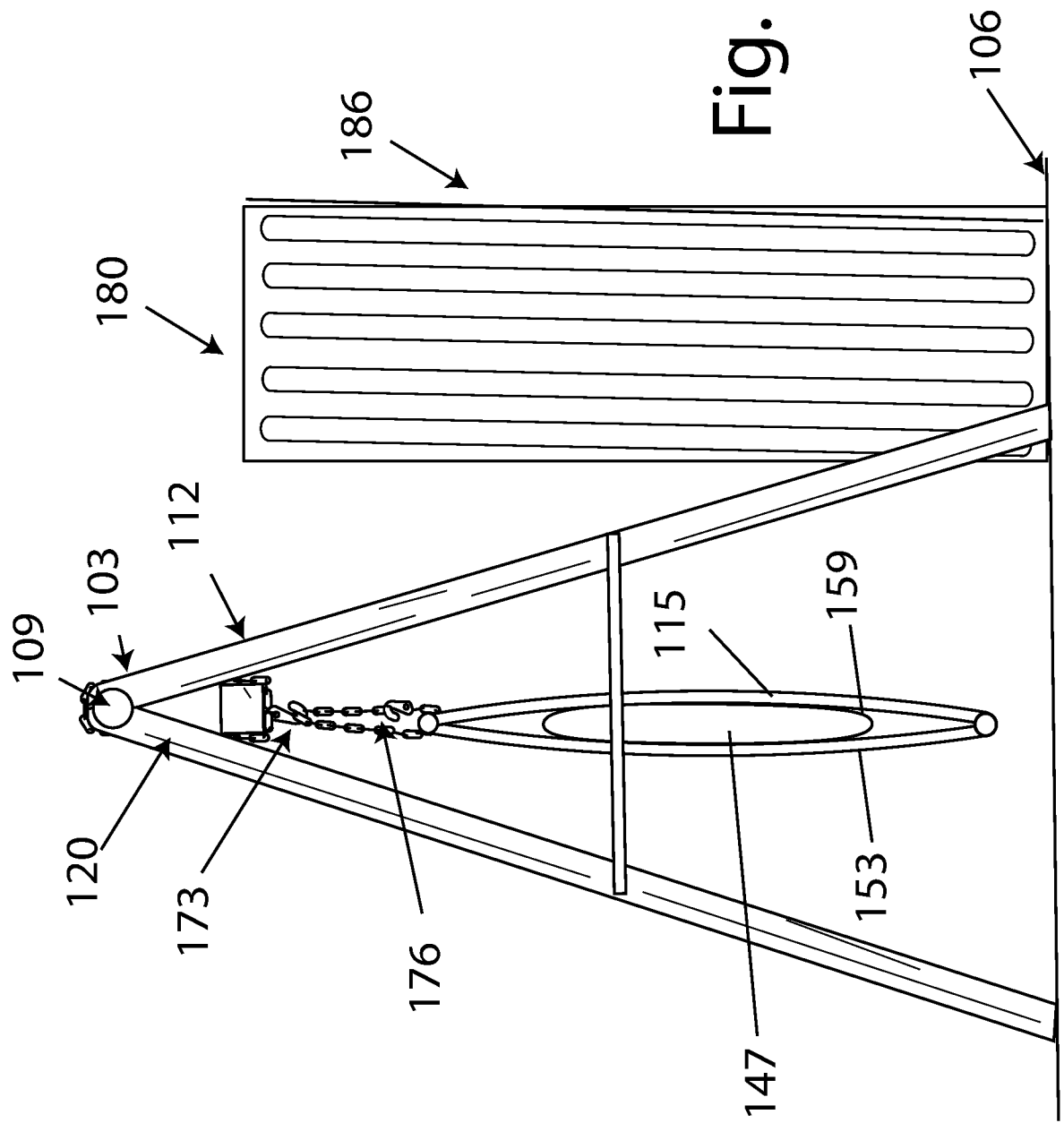

OUTDOOR ROTISSERIE SYSTEM FOR ROASTING MEAT

CROSS REFERENCE TO RELATED APPLICATIONS

This application is not related to other applications at the date of filing.

FIELD OF THE INVENTION

The disclosure relates to rotisseries for roasting meat in the outdoors.

BACKGROUND OF THE INVENTION

Outdoor rotisserie systems for roasting meat may include an elongated spit ("spit") for carrying a meat body, a set of spit mounts supporting the spit for rotation, a rotisserie motor assembly for driving rotation of the spit on the spit mounts, and a heat source spaced from the meat body and rotisserie motor assembly. The spit may extend in the horizontal direction such as, for example, when carrying a pig over an open fire. The spit, in some embodiments, may be an elongated unitary spit shaft or bar. In other embodiments, the spit may be an assembly ("spit assembly") including an elongated spit shaft and a set of spit forks carried on the spit shaft to penetrate opposite ends of the meat body carried on the spit shaft, and thus to fix the meat body for rotation in common with the spit shaft and spit forks.

Safely roasting a meat body such as a pig outdoors, on a horizontal spit over an open fire, may require a large footprint of ground area. This large footprint may limit the size and types of venues that are convenient for an outdoor pig roasting event. Often, pig roasting events are limited to permanent or semi-permanent venues that are prepared and sized for carrying out the roast, with fire hazards eliminated or under reasonable control and ample space for spectators. To ensure safety, for example, the minimum footprint of the venue may be too large for many residences. It may be necessary to locate and prepare an unexpectedly large, open and level area of ground for the fire and spit, an adjacent spectator area, and also then to clear out ignitable materials from a large border area surrounding the fire and spit area.

When roasting a meat body such as a pig on a horizontal spit over an open fire, fats dripping into the fire may pose a blaze hazard and also may present a hazard of popping, hot fat droplets flying out of the fire towards individuals who may be located nearby. Changing flames and heated air rising rapidly from the open fire cause difficulty for controlling cooking temperature, and maintaining constant cooking temperature, at the exterior of the meat body. These thermal control problems require close or continuous monitoring by a cook and even so may cause poor roasting results such as burning, overcooking and undercooking of the meat. Changing position of the meat body relative to the open fire, such as to control cooking temperature at the meat body, is difficult and may require at least two people equipped with protective gloves or tools to raise or lower the opposite ends of the spit while loaded with the dangerously hot meat body. Repositioning the spit may be limited by the position of rungs on the set of spit mounts. If the spit is repositioned, the spit is carrying the weight of the meat body above the open fire, such that the meat body easily can be dropped or inadvertently lowered into the flames and damaged by being burned. Repositioning the spit also may require individuals to closely approach the open flames, reach toward the flames, or reach into rising heated air, and in addition to causing physical discomfort also poses risks of suffering physical injuries. These difficulties, cumulatively, make pig roasting events into a physically demanding, hazardous pursuit that is not readily suitable for an unassisted, individual cook to conveniently perform, for example, in his, or her, backyard.

Setting up a horizontal spit assembly carrying a large meat body such as a pig to function properly may require inordinate effort and attention to alignment, leveling the spit and spit mounts, and careful attention and structure for mounting the rotisserie motor assembly in a fixed, elevated position relative to one end of the spit shaft, with the spit mounts, spit shaft and rotisserie motor assembly aligned along a common horizontal axis to provide a reliable driving relationship which will endure through a lengthy roasting session while exposed to the elevated temperatures. Maintaining the essential driving relationship and alignment of components may be difficult and is subject to multiple possible points of failure. Where alignment is disrupted during a roasting session, such as by the rotisserie motor assembly shifting out of alignment or out of driving engagement with the end of the spit shaft, one possible result is that the meat body may be burned on those sides nearest the fire and rising heated air, while the rotisserie components are re-aligned. For example, it may be necessary to re-mount the rotisserie motor assembly on a suitable support structure to secure it in the fixed, elevated location required for driving engagement with the spit shaft carrying the meat body. In order to maintain level, horizontal alignment and driving engagement, it may be necessary to mount one or more of the spit shaft, spit mounts, and rotisserie motor assembly in fixed relationship on a common frame.

For reasons stated above and for other reasons which will become apparent to those skilled in the art upon reading and understanding the present specification, there is a need in the art for improved systems, apparatus and methods for securing and managing tools at job sites.

BRIEF DESCRIPTION OF THE INVENTION

The above-mentioned shortcomings, disadvantages and problems are addressed herein, as will be understood by those skilled in the art upon reading and studying the following specification. This summary is provided to introduce a selection of concepts in a simplified form that are further described below in more detail in the detailed description of embodiments. This summary is not intended to identify key or essential features of the claimed subject matter. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In an aspect, a rotisserie system for roasting meat outdoors may include a vertical support assembly for supporting a bulk meat body without a spit shaft or spit forks. In embodiments, an outdoor rotisserie system may include a set of legs configured to rest on the ground, a rotisserie drive system supported by the set of legs, a meat basket assembly supported by the rotisserie drive system, a drive-to-basket connecting assembly, and a heat deflector assembly in an erect, standing configuration on the ground at a heat deflector position spaced from the meat basket assembly, wherein a roasting fire is located on the ground in a roasting fire position spaced apart from the meat basket assembly and adjacent the heat deflector assembly. The heat deflector assembly may define a U-shaped partial enclosure extending along all sides of the roasting fire, except the side nearest the meat roasting assembly, which opens towards the meat basket assembly to direct heat from the roasting fire towards the meat basket assembly. The rotisserie drive system may include a rotisserie drive system frame forming an enclosure supported by the set of legs, and an electric rotisserie drive motor, a rotisserie drive gear mechanism, a rotisserie drive shaft, and drive mounting bearing each supported by the rotisserie drive system frame. The meat basket assembly is driven for rotation about a meat basket axis that may extend in the vertical direction. The meat basket assembly may include a basket top bar supporting basket sides formed of open mesh wire material. The system may include a heat deflector assembly spaced from the meat basket assembly, which may form a partial enclosure directing heat of an adjacent roasting fire toward the meat basket assembly.

A system as disclosed may be assembled from components of a kit, which may be stored between uses and transported to a roasting event location in a disassembled condition. A system as disclosed may include the heat deflector assembly and roasting fire that may be selectively located on the ground, independent of the set of legs, and spaced from the meat basket assembly at distances which may be controlled independently by setting and adjusting location of the set of legs, and location of the meat basket assembly loaded with a bulk meat body being roasted, and location and configuration of the heat deflector assembly in respective heat deflector position and roasting fire position. A system as disclosed may provide simplified control of heat, roasting temperature, and other roasting conditions. A system as disclosed may provide a compact footprint on the ground, which may be smaller than footprint of other roasting systems, such as open roasting systems that omit a heat deflector. A system may include a meat basket assembly having advantageous weight distributed support of a bulk meat body being roasted by basket sides formed of open mesh wire material supported, or hanging, from an extended basket top bar to distribute the weight load, and which avoids problems associated with spit or spit fork configurations providing less effective weight distribution. A system as disclosed may include the meat basket assembly being moveable and adjustable relative to a single point of vertical support, from which the meat basket assembly may hang, and with relative ease and user safety. A system as disclosed may be assembled in a vertical configuration, without need to precisely align multiple components of a horizontal rotisserie spit and drive system, and without need to maintain or re-establish alignment of such a horizontal spit and drive system. A system as disclosed may be provided and used without necessity to align multiple components supported relative to the ground surface, to rely upon aligned components remaining in a fixed position and attitude relative to the ground and other aligned components, and to correct misalignments by re-establishing support relative to the ground for multiple aligned components which require support from the ground. A system as disclosed may have reduced points of failure by misalignment of components, such as by moving out of alignment. A system may be adjusted and aligned to function with limited control of supporting relationships between the ground and system components, which may be limited to controlling, adjusting and aligning the set of legs, and the leg positions, relative to the ground surface, the heat deflector assembly and heat deflector position relative to the ground surface, and in some embodiments, the roasting fire and roasting fire position relative to the ground surface.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein:

FIG. 2 is a simplified front view of the outdoor rotisserie system shown generally in FIG. 1.

FIG. 3 is an enlarged partial cross-sectional view taken generally along 3-3 in FIG. 1, showing detail of the rotisserie drive system frame, electric rotisserie drive motor, rotisserie drive gear mechanism, rotisserie drive shaft, drive-to-basket connecting assembly, and drive mounting bearing.

FIG. 8 is a top view of the rotisserie drive mounting bearing on the rotisserie drive system frame, taken generally along 8-8 in FIG. 3.

FIG. 9 is a simplified partial schematic top view of the rotisserie heat shield assembly, taken generally along 9-9 in FIG. 2.

FIG. 10 is a simplified front view of an exemplary panel of the rotisserie heat shield assembly shown generally in FIG. 9.

FIG. 11 is a simplified rear view of the exemplary panel of the rotisserie heat shield assembly shown generally in FIG. 10.

FIG. 12 is a simplified partial side view of the outdoor rotisserie system, taken generally along 12-12 in FIG. 1.

DETAILED DESCRIPTION OF THE INVENTION

Figure 1:
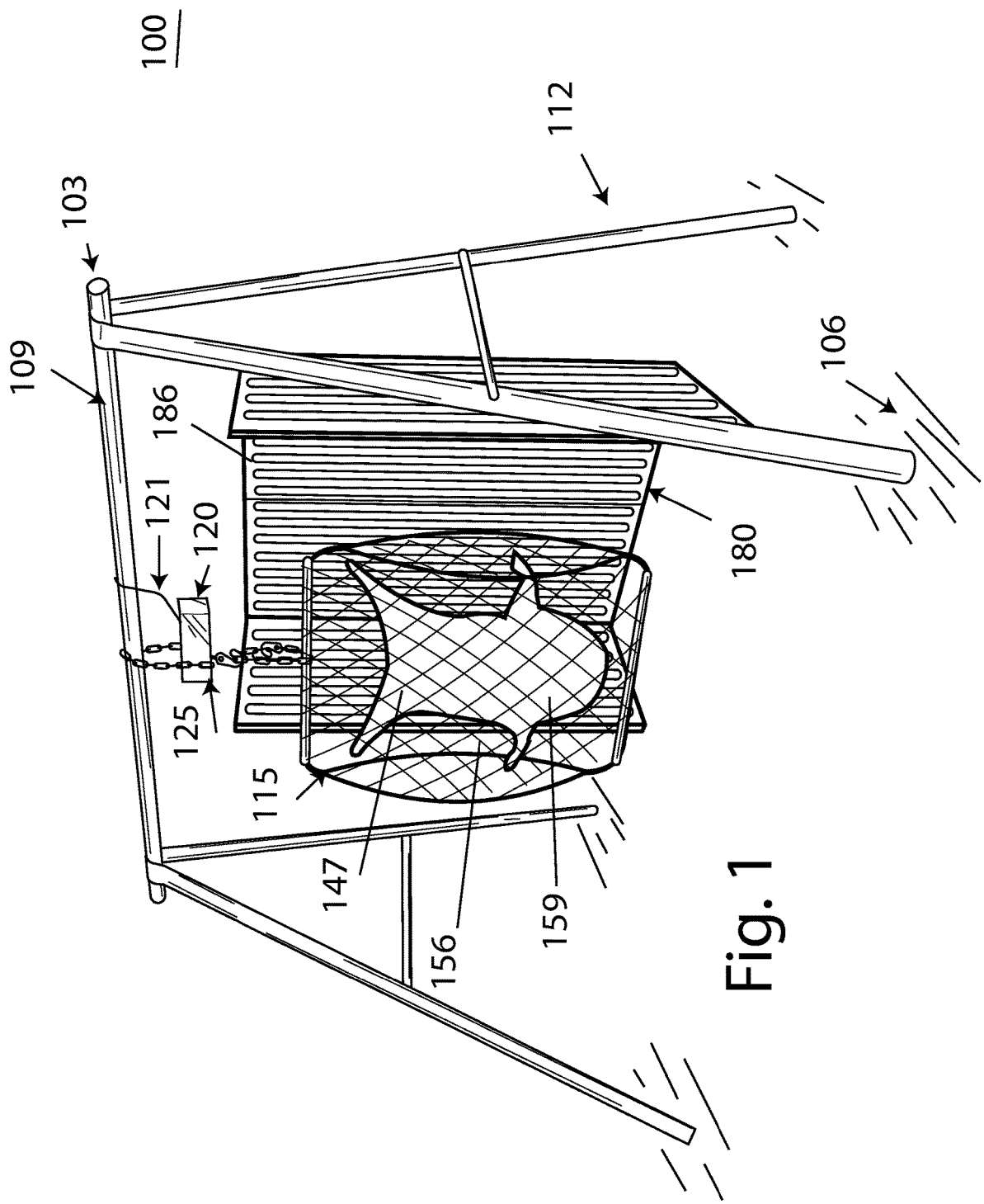
FIG. 1 is a simplified perspective view of an outdoor rotisserie system for roasting meat, according to an embodiment.

In the following detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

FIG. 1 is a simplified perspective view of an outdoor rotisserie system 100 for roasting meat, according to an embodiment. The meat being roasted may be a bulk meat body such as, for example, a whole pig or other bulk meat body. As shown in FIG. 1, in an embodiment the outdoor rotisserie system may include a set of legs 103 configured to rest upon a ground surface 106 (shown in FIG. 2). In an embodiment shown in FIG. 1, the set of legs 103 may be arranged in a sawhorse configuration. In the sawhorse configuration, the set of legs 103 may include an elongated sawhorse body member 109 extending in a horizontal direction. The set of legs may include a set of sawhorse legs 112 joined to the sawhorse body member 109 at opposite ends of same. In a particular embodiment as shown in FIG. 1, the set of legs 103 in a sawhorse configuration may define an A-frame configuration. The set of sawhorse legs 112 may be spaced apart to clear the meat basket assembly 115 when rotating about a meat basket axis. In embodiments, as shown, the set of legs 103 may include a plurality of elongated tubular structural members formed of suitable material, such as steel or other suitable metal.

As shown in FIG. 1, in an embodiment the outdoor rotisserie system 100 may include a rotisserie drive system 120 supported by the set of legs 103. As best shown in FIG. 3, the rotisserie drive system 120 may include a rotisserie drive system frame 123 supported by the set of legs 103 (shown in FIG. 1). As shown in FIGS. 1-3, the rotisserie drive system frame 123 may be configured to support some, or all, other components of the rotisserie drive system 120. In an embodiment as shown in FIG. 3, the rotisserie drive system frame 123 may be configured to support at least one of: the electric rotisserie drive motor 126, rotisserie drive gear mechanism 129 for rotating movement of the gear mechanism, the rotisserie drive shaft 132, the drive-to-basket connecting assembly 135 and the drive mounting bearing 144. As shown in FIGS. 1-3, the rotisserie drive system frame may define a housing 125 configured to enclose at least one of: the electric rotisserie drive motor 126, rotisserie drive gear mechanism 129 for rotating movement of the gear mechanism, the rotisserie drive shaft 132, the drive-to-basket connecting assembly 135 and the drive mounting bearing 144.

Referring to FIG. 3, the rotisserie drive system 120 may include an electric rotisserie drive motor 126 having a rotating motor shaft. In an embodiment as shown, the electric rotisserie drive motor 126 may be supported by the rotisserie drive system frame 123, relative to the set of legs 103 and above the meat basket assembly 115. The electric rotisserie drive motor 126 may be connected to a suitable power supply, such as a 110 volt outlet (not shown), by a suitable insulated power cord 121.

As shown in FIG. 3, the rotisserie drive system 120 may include a rotisserie drive gear mechanism 129 engaged with the motor shaft to be driven by the electric rotisserie drive motor 126. The rotisserie drive gear mechanism 129 may include a set of gears trained from a gear mechanism input to a gear mechanism output. The drive gear mechanism input may be configured to be driven by the motor shaft of the electric rotisserie drive motor 126. The gear mechanism output may be driven for rotation by the trained set of gears. The drive gear mechanism 129 may be configured to reduce rotation speed of the gear mechanism output to a reduced output rate that is slower than rotation of the motor shaft of the electric rotisserie drive motor 126.

Figure 4:
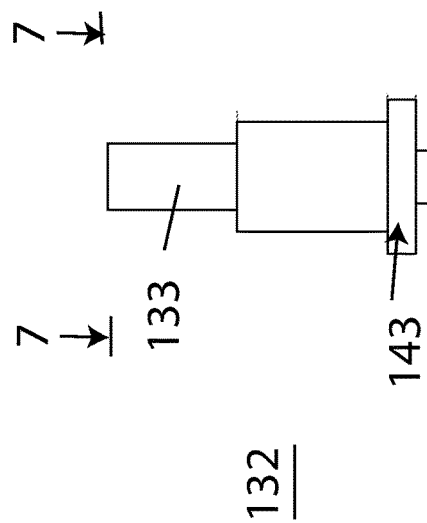
FIG. 4 is a simplified perspective view of a rotisserie drive shaft in a rotisserie drive system as shown generally in FIG. 3.
Figure 6:
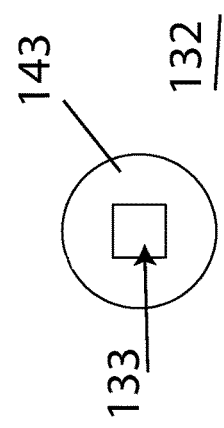
FIG. 6 is an upper end view of the rotisserie drive shaft, taken generally along 6-6 in FIG. 5.

As shown in FIG. 3, the rotisserie drive system 120 may include a rotisserie drive shaft 132 supported for rotation about a drive shaft axis 131. The drive shaft axis 131 may extend in a vertical direction. In an embodiment, as shown in FIG. 1, the drive shaft axis 131 may have freedom to shift position, progress, or change through a range of directions that may vary from the vertical direction. The rotisserie drive shaft 132 may have a first end 133 configured for engagement with the gear mechanism output to be driven by the drive gear mechanism 129. As best shown in FIGS. 4 and 6, in the particular embodiment shown the first end 133 may have a square cross section. The rotisserie drive shaft 132 may have a second end 137 spaced from the first end 133 in opposed relation to the first end 133. The second end 137 may be configured for driving engagement with the drive-to-basket connecting assembly 135. In the particular embodiment shown in FIGS. 3 and 7, the second end 137 may include an aperture 139 having female threads 141 on an interior wall surface thereof. As best shown in FIG. 3, the rotisserie drive shaft 132 may include a continuous drive shaft shoulder 143 spaced from the drive shaft axis and intersecting a drive shaft outer surface. The drive shaft shoulder 143 may define a force bearing surface or thrust surface. The drive shaft shoulder 143 may be configured for mating engagement with the drive mounting bearing 144 to support the rotisserie drive shaft 132 for rotation relative to the rotisserie drive system frame 123.

As shown in FIG. 3, the rotisserie drive system 120 may include a drive mounting bearing 144 supported by the rotisserie drive system frame 123 and affixed to same. The drive mounting bearing 144 may support the rotisserie drive shaft 132, the drive-to-basket connecting assembly 135, or both, for rotation relative to the rotisserie drive system frame 123. Particularly, the drive mounting bearing 144 may support the rotisserie drive shaft 132 for rotation about the drive shaft axis, the drive-to-basket connecting assembly 135 for rotation about the connecting assembly axis, or both. In one embodiment, a suitable drive mounting bearing 144 may be a two-bolt flange-mounted bearing with ball bearing insert (Dayton model 3FCU8, available from Grainger Supply, Lake Forest, Ill.).

As shown in FIG. 1, in an embodiment the outdoor rotisserie system 100 may include a meat basket assembly 115 configured to receive a bulk meat body 147 for rotation in common therewith about a basket axis. The meat basket assembly 115 may include a set of basket sides 153 including flexible open wire mesh material 156 defining basket major inside support surfaces. As shown in FIGS. 1 and 12, the set of basket sides 153 may be configured to engage corresponding major outside surfaces 159 of the bulk meat body 147, in opposed supporting relationship therewith, to distribute a weight load of the bulk meat body 147 from the major outside surfaces 159 of the bulk meat body 147 to corresponding of the major inside support surfaces of the open wire mesh material 156 of the basket sides 153 in both the vertical direction and horizontal direction.

As shown in FIG. 1, the meat basket assembly 115 may include a basket top bar 165 configured to support the set of basket sides 153 in hanging relationship therewith. The basket top bar 165 may be elongated in the horizontal direction to support the distributed weight load of the bulk meat body 147 carried and transferred to the basket top bar 165 by the set of basket sides 153.

Figure 13:
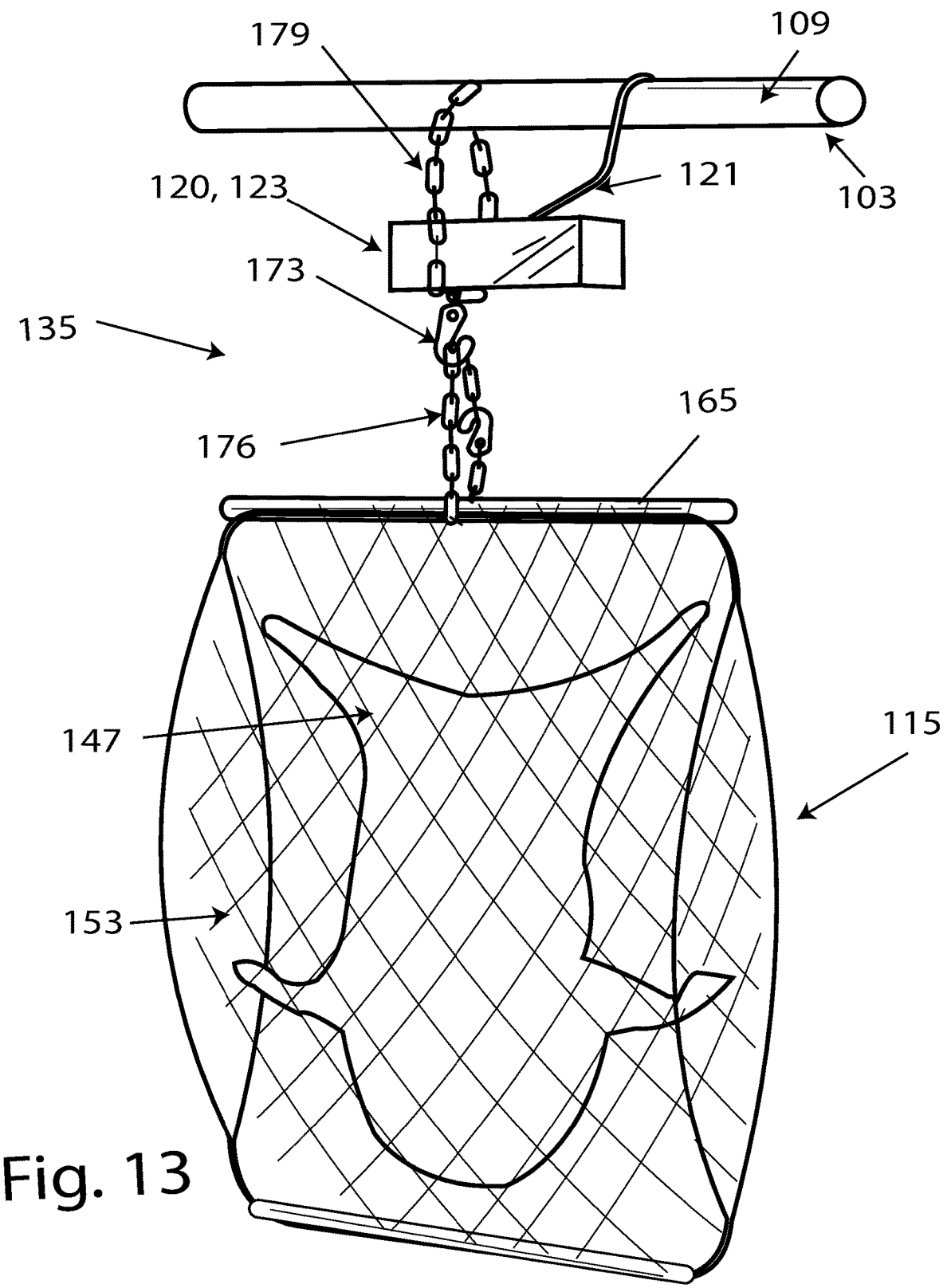
FIG. 13 is an enlarged partial perspective view showing the meat basket assembly, generally depicted in FIG. 1.

As shown in FIGS. 1-3, in an embodiment the outdoor rotisserie system 100 may include a drive-to-basket connecting assembly 135 supported for rotation about the connecting assembly axis relative to the rotisserie drive system frame 123. The drive-to-basket connecting assembly 135 may be supported by at least one of the drive mounting bearing 144 and the second end 137 of the rotisserie drive shaft 132. As shown in FIG. 3, the drive-to-basket connecting assembly 135 may include a first portion 145 configured for engagement with the second end 137 of the rotisserie drive shaft 132 to be driven for rotation about the connecting assembly axis. As shown in FIG. 13, the drive-to-basket connecting assembly 135 may include a second portion 147 joined to the first portion 145, the second portion configured for engagement with the basket top bar 165 to drive rotation of the meat basket assembly 115 about the basket axis.

As shown in FIG. 1, in an embodiment the drive-to-basket connecting assembly 135 may be configured for engagement with the basket top bar 165 to support the meat basket assembly 115 above the ground 106. As shown in FIG. 3, in an embodiment the drive-to-basket connecting assembly 135 may include an elongated eye-bolt 149 supported by the rotisserie drive shaft 132 for rotation about the connecting assembly axis. Eye-bolt 149 may include at first portion 145 a set of male threads configured for mating threaded engagement with the female threads 141 of the aperture 139 of the second end 137 of rotisserie drive shaft 132. Eye-bolt 149 at second portion 147 may include an eyelet opposite the first portion 145 having male threads. As shown in FIG. 13, in an embodiment the drive-to-basket connecting assembly 135 may include a hook 173 supported by the eye-bolt 149 at the eyelet, for rotation about the connecting assembly axis. As best shown in FIG. 13, the drive-to-basket connecting assembly 135 also may include a first flexible chain 176 supported on hook 173. The first flexible chain 176 may include a series of interconnected chain links. In an embodiment as shown in FIG. 13, the first flexible chain 176 may be joined from the hook 173 to the basket top bar 165 to support the meat basket assembly 115.

As shown in FIG. 1, the rotisserie drive system 100 may include a second flexible chain 179. The second flexible chain 179 may include a series of interconnected chain links. In an embodiment as shown in FIG. 13, the second flexible chain 179 may be joined from the set of legs 103 to the rotisserie drive system frame 123 to support the rotisserie drive system frame 123 relative to the set of legs 103.

As shown in FIG. 1, the outdoor rotisserie system 100 may include a heat deflector assembly 180 configured to rest on the ground in a heat deflector position. The heat deflector position may be spaced apart from a vertical projection of the meat basket assembly 115, by a deflector distance. In embodiments, the heat deflector assembly 180 may be selectively moveable between a plurality of heat deflector positions. Each of the plurality of heat deflector positions may be spaced apart from the vertical projection of the meat basket assembly 115 at a corresponding plurality of deflector distances. As shown in FIG. 1, the heat deflector assembly 180 may include a plurality of panels 186 each formed of sheet metal. As shown in FIG. 11, the heat deflector assembly 180 may include a frame assembly 189 supporting the plurality of sheet metal panels 186. The heat deflector assembly 180 may be configurable from a storage condition to a standing condition. The heat deflector assembly 180 in the standing condition may define a partial enclosure configuration extending along all remote sides of an adjacent roasting fire. The partial enclosure configuration of the heat deflector assembly 180 may be open along the one side or portion of the roasting fire located nearest the vertical projection of the meat basket assembly 115, to deflect heat from the roasting fire towards the meat basket assembly 115.

As shown in FIG. 1, the outdoor rotisserie system 100 may include the roasting fire located at a roasting fire position. The roasting fire position may be located on the ground 106 intermediate the heat deflector assembly 180 and a vertical projection of the meat basket assembly 115. As shown in FIG. 1, the rotisserie drive system 100 may include a second flexible chain 179. The second flexible chain 179 may include a series of interconnected chain links. The second flexible chain 179 may be joined from the sawhorse body member 109 to the rotisserie drive system frame 123.

FIG. 2 is a simplified front view of the outdoor rotisserie system shown generally in FIG. 1. The heat deflector assembly 180 is spaced apart from meat basket assembly 115 to direct heat from a roasting fire towards the meat basket assembly 115. FIG. 9 is a simplified partial schematic top view of the rotisserie heat deflector assembly 180, taken generally along 9-9 in FIG. 2. FIG. 10 is a simplified front view of an exemplary panel 186 of the rotisserie heat deflector assembly 180 shown generally in FIG. 9. FIG. 11 is a simplified rear view of the exemplary panel 186 of the rotisserie heat deflector assembly 180 shown generally in FIG. 10.

Figure 5:
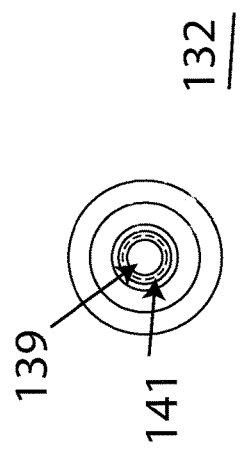
FIG. 5 is a side view of the rotisserie drive shaft, taken generally along 5-5 in FIG. 4.
Figure 7:
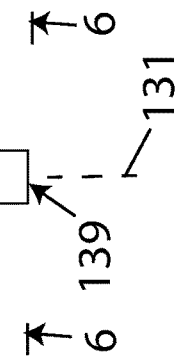
FIG. 7 is a bottom end view of the rotisserie drive shaft, taken generally along 7-7 in FIG. 5.

FIG. 3 is an enlarged partial cross-sectional view taken generally along 3-3 in FIG. 1, showing detail of the rotisserie drive system 120 including rotisserie drive system frame 123, electric rotisserie drive motor 126, rotisserie drive gear mechanism 129, rotisserie drive shaft 132, drive-to-basket connecting assembly 135, and drive mounting bearing 144. FIG. 4 is a simplified perspective view of the rotisserie drive shaft 132 in the rotisserie drive system 120 shown generally in FIG. 3. FIG. 5 is a side view of the rotisserie drive shaft, taken generally along 5-5 in FIG. 4. FIG. 6 is an upper end view of the rotisserie drive shaft, taken generally along 6-6 in FIG. 5. FIG. 7 is a bottom end view of the rotisserie drive shaft, taken generally along 7-7 in FIG. 5. FIG. 8 is a top view of the rotisserie drive mounting bearing 144 supporting rotisserie drive shaft 132 on the rotisserie drive system frame 123, taken generally along 8-8 in FIG. 3.

FIG. 12 is a simplified partial side view of the outdoor rotisserie system 100, taken generally along 12-12 in FIG. 1. Bulk meat body 147 is captured between and supported by cooperation of the set of basket sides 153 and basket top bar 165. FIG. 13 is an enlarged partial perspective view showing the meat basket assembly 115 including basket top bar 165 supporting the set of basket sides 153 having a bulk meat body 147 captured therebetween.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above described embodiment, method, and examples, but by all embodiments and methods within the scope and spirit of the invention. In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials. All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. An outdoor rotisserie system, comprising:
   a set of legs configured to rest upon a ground surface;
   a rotisserie drive system supported by the set of legs, the rotisserie drive system comprising:
      an electric rotisserie drive motor having a motor shaft;
      a rotisserie drive gear mechanism engaged with the motor shaft to be driven thereby, the drive gear mechanism including a set of gears, the set of gears including a gear mechanism input configured to be driven by the motor shaft, the set of gears trained from the gear mechanism input to a gear mechanism output driven thereby, the set of gears configured to reduce rotation speed of the gear mechanism output to an output rate slower than the motor shaft;
      a rotisserie drive shaft supported for rotation about a vertical drive shaft axis, the rotisserie drive shaft having a first end configured for engagement with the gear mechanism output to be driven thereby, the rotisserie drive shaft having a second end spaced from the first end in opposed relation thereto, the second end configured for driving engagement with a drive-to-basket connecting assembly;
      a rotisserie drive system frame supported by the set of legs, the rotisserie drive system frame configured to support at least one of the electric rotisserie drive motor and rotisserie drive gear mechanism for rotating movement of the gear mechanism output relative to the rotisserie drive system frame;
      a drive mounting bearing supported by the rotisserie drive system frame, the drive mounting bearing supporting at least one of the following for rotation relative to the rotisserie drive system frame:
         the rotisserie drive shaft for rotation about the drive shaft axis, and the drive-to-basket connecting assembly for rotation about the connecting assembly axis;
   a meat basket assembly configured to receive a bulk meat body for rotation in common therewith about a basket axis, the meat basket assembly comprising:
      a set of basket sides comprising flexible open wire mesh material defining basket major inside support surfaces, the set of basket sides configured to engage corresponding major outside surfaces of the bulk meat body in opposed supporting relationship therewith to distribute a weight load of the bulk meat body from the major outside surfaces thereof to corresponding of the major inside support surfaces of the open wire mesh material in both the vertical direction and horizontal direction;
      a basket top bar configured to support the set of basket sides in hanging relationship therewith, the basket top bar elongated in the horizontal direction to support the distributed weight load from the set of basket sides; and
   the drive-to-basket connecting assembly:
      supported for rotation about the connecting assembly axis relative to the rotisserie drive system frame, the drive-to-basket connecting assembly supported by at least one of the drive mounting bearing and the second end of the rotisserie drive shaft;
      comprising a first portion configured for engagement with the second end of the rotisserie drive shaft to be driven for rotation about the connecting assembly axis;
      comprising a second portion joined to the first portion, the second portion configured for engagement with the basket top bar to drive rotation of the meat basket assembly about the basket axis.

2. The outdoor rotisserie system of claim 1, comprising:
   the drive-to-basket connecting assembly configured for engagement with the basket top bar to support the meat basket assembly above the ground.

3. The outdoor rotisserie system of claim 2, comprising:
   the drive-to-basket connecting assembly comprising a hook supported by the drive mounting bearing for rotation about the connecting assembly axis.

4. The outdoor rotisserie system of claim 3, comprising:
the drive-to-basket connecting assembly comprising a first flexible chain comprising interconnected chain links, the first flexible chain joined from the hook to the basket top bar.

5. The outdoor rotisserie system of claim 3, comprising:
the rotisserie drive system comprising a second flexible chain comprising interconnected chain links, the second flexible chain joined from the set of legs to the rotisserie drive system frame.

6. The outdoor rotisserie system of claim 1, comprising:
the set of legs comprising a sawhorse configuration, the set of legs comprising an elongated sawhorse body member extending in a horizontal direction, the set of legs comprising a set of sawhorse legs joined to the sawhorse body member at opposite ends thereof.

7. The outdoor rotisserie system of claim 6, comprising:
the rotisserie drive system comprising a second flexible chain comprising interconnected chain links, the second flexible chain joined from the sawhorse body member to the rotisserie drive system frame.

8. The outdoor rotisserie system of claim 7, comprising:
the rotisserie drive system frame comprising a housing configured to enclose at least the drive mounting bearing.

9. The outdoor rotisserie system of claim 6, comprising:
the set of legs comprising a sawhorse configuration defining an A-frame configuration.

10. The outdoor rotisserie system of claim 6, comprising:
the set of sawhorse legs spaced apart to clear the meat basket assembly when rotating.

11. The outdoor rotisserie system of claim 1, comprising:
a heat deflector assembly configured to rest on the ground in a heat deflector position, the heat deflector position spaced apart from a vertical projection of the meat basket assembly by a deflector distance.

12. The outdoor rotisserie system of claim 11, comprising:
the heat deflector assembly selectively moveable between a plurality of heat deflector positions, the plurality of heat deflector positions spaced apart from the vertical projection of the meat basket assembly at a corresponding plurality of deflector distances.

13. The outdoor rotisserie system of claim 11, comprising:
the heat deflector assembly comprising a plurality of sheet metal panels.

14. The outdoor rotisserie system of claim 13, comprising:
the heat deflector assembly comprising a frame assembly supporting the plurality of sheet metal panels.

15. The outdoor rotisserie system of claim 1, comprising:
a roasting fire position located intermediate the heat deflector position and the vertical projection of the meat basket assembly.

16. The outdoor rotisserie system of claim 15, comprising:
a roasting fire at the roasting fire position.

17. The outdoor rotisserie system of claim 1, comprising:
the rotisserie drive system frame comprising a housing configured to enclose at least the drive mounting bearing.

18. The outdoor rotisserie system of claim 17, comprising:
the housing configured to enclose at least the drive mounting bearing and rotisserie drive gear mechanism.

19. The outdoor rotisserie system of claim 1, comprising:
the drive shaft having a continuous drive shaft shoulder spaced from the drive shaft axis, the drive shaft shoulder intersecting a drive shaft outer surface.

20. The outdoor rotisserie system of claim 19, comprising:
the drive shaft shoulder configured for mating engagement with the drive mounting bearing to support the drive shaft for rotation relative to the rotisserie drive system frame.

\* \* \* \* \*